United States Patent [19]

Biranowski et al.

[11] 4,271,273

[45] Jun. 2, 1981

[54] RIGID ISOCYANURATE POLYURETHANE FOAMS AND METHOD FOR PREPARING SAME

[75] Inventors: Jerome B. Biranowski, New York, N.Y.; Donald H. Lorenz, Basking Ridge; Simon W. Kantor, Ridgewood, both of N.J.

[73] Assignee: GAF Corporation, New York, N.Y.

[21] Appl. No.: 51,352

[22] Filed: Jun. 25, 1979

[51] Int. Cl.$^3$ ............... C08G 18/14; C08G 18/32; C08G 18/76
[52] U.S. Cl. ................... 521/110; 521/129; 521/131; 521/160; 521/170; 521/902; 521/123; 521/125; 521/124
[58] Field of Search ............... 528/75; 521/129, 160, 521/170, 902, 131, 110

[56] References Cited

U.S. PATENT DOCUMENTS

| | | | |
|---|---|---|---|
| 3,737,400 | 6/1973 | Kumasaka et al. | 521/119 |
| 3,810,851 | 5/1974 | Norman et al. | 521/88 |
| 3,928,256 | 12/1975 | Cenker et al. | 521/902 |
| 4,002,580 | 1/1977 | Russo | 528/75 |
| 4,025,469 | 5/1977 | Kauffman | 521/902 |
| 4,094,869 | 6/1978 | Biranowski et al. | 521/902 |

*Primary Examiner*—H. S. Cockeram
*Attorney, Agent, or Firm*—James Magee, Jr.; Joshua J. Ward

[57] ABSTRACT

Rigid isocyanurate urethane polymers useful for insulation purposes and characterized by superior thermal stability are prepared by reacting an excess of polymeric isocyanate with butenediol in the presence of blowing agent and catalyst.

11 Claims, No Drawings

RIGID ISOCYANURATE POLYURETHANE FOAMS AND METHOD FOR PREPARING SAME

BACKGROUND OF THE INVENTION

The demand for fire retardant, rigid polyurethane foams has increased sharply in recent years as have the governmental and industry standards that these foams must meet before they may be used in many areas where their use is particularly desired, especially in the construction industry.

Various means are known for imparting thermal stability to polyurethane foams. These include the incorporation of various unreactive fillers and additives, as well as the inclusion in the polyurethane foam of compounds containing functional groups which become chemically bound in the polymeric urethane chain and the coating of rigid polyurethane foam materials with flame retarding materials.

Among the unreactive additives have been inorganic and organic substances. Illustrative of the inorganic additives have been metal oxides such as $Sb_2O_3$, $ZnO$ and $Al_2O_3$. It has also been suggested heretofore to incorporate a combination of these unreactive additives to secure good fire retardancy.

The use of hydrated alumina and antimony oxide as additives in low density, flexible and semi-flexible polyurethanes incorporating halogen-containing polymers, such as polyvinyl chloride, has also been suggested, illustratively in U.S. Pat. No. 3,810,851. There is also described in U.S. Pat. No. 3,737,400 a polyurethane foam said to possess self-extinguishing characteristics wherein the flame-suppressing agent is ammonium hydroxide hydrate and $KCl$, $K_2O$, $KNO_3$, $Ca(OH)_2$, $Mg(OH)_2$, $K_2SO_4$ and $Ba(OH)_2$.

Further illustrative of the additives for use in rendering polyurethane foams flame retardant and reported heretofore in U.S. Pat. No. 3,262,894 is tris(2-chloroethyl) phosphate in combination with alumina trihydrate.

The improvement in fire retandancy provided by the foregoing additives has often been obtained however at some sacrifice in physical properties. Thus, loadbearing capacity and closed cell content have been found to decrease frequently while moisture vapor pressure transmission often increases. The strength properties of humid aging at elevated temperatures are usually reduced considerably, as well.

To retain the inherent physical properties of the foam considered desirable for use in construction, appliances and the like while imparting an adequate fire retardancy thereto has thus involved a compromise between desired objectives.

One means for alleviating this compromise has been by incorporation of a flame-retarding moiety in the polymer chain itself. Thus, polyurethane foams prepared from the reaction of a polymeric isocyanate; an organic compound incorporating active hydrogen-containing groups reactive with isocyanate moieties; and a dibromobutenediol have, for example, been suggested heretofore. These polyurethanes have been characterized by a significant fire retardancy and have been described broadly for use in fiber, foams and particularly flexible foams, films and the like. It has also been known to prepare rigid foams manifesting a thermal and oxidative stability considered adequate in various applications utilizing thermal insulation by inclusion in the cross-linked urethane polymer of conventional isocyanurates resulting from isocyanate trimerization in the production of the rigid foam.

U.S. Pat. No. 4,094,869 has further suggested a particular rigid polyurethane foam system incorporating 2,3-dibromo-2-butene-1,4-diol along with antimony oxide and hydrated alumina.

While all of the approaches to the thermal stability problem mentioned above have been successful in varying degrees, none have been completely satisfactory in terms both of ability to meet the various industry and governmental standards desired and the desired ease of manufacture.

SUMMARY OF THE INVENTION

The present invention is an improved thermally stable, rigid cellular isocyanurate polyurethane foam and process for making same. The foam comprises the post cured reaction product of reacting in the presence of a blowing agent and trimerization catalyst:

(a) polyol comprising at least about 14 wt% 2-butene,-1,4-diol; and (b) aromatic polyisocyanate in an amount such that the active hydrogen groups present in the polyol are less than 50% of the number of isocyanate groups present in the polyisocyanate of the reaction mixture. The process of the invention comprises reacting the above diol and polyisocyanate ingredients in the presence of a blowing agent and trimerization catalyst and then post curing the resulting reaction mixture. Use of polymethylene polyphenyl polyisocyanate as at least about 50% of the polyisocyanate is preferred, as is the use of trichlorofluoromethane as a blowing agent and tertiary amine catalyst.

DETAILED DESCRIPTION OF THE INVENTION

As noted above, the product and process of the invention involve reaction of polyol comprising at least about 14 wt% 2-butene, 1-4-diol with aromatic polyisocyanate. Polyisocyanate suitable for use in product and process of the invention may be any of the conventional aromatic polyisocyanates known for use in the manufacture of polyurethane foams or may be mixtures of such polyisocyanates. Suitable polyisocyanates generally have at least two isocyanate groups per molecule and include, for instance, the aromatic polyisocyanates described in more detail in U.S. Pat. Nos. 4,067,833, 4,008,188 and 4,094,869, the disclosures of which are incorporated herein by reference. Preferred polyisocyanates are methylene bridged isocyanates of the type described in the above mentioned U.S. Pat. Nos. 4,008,188 and 4,094,869.

Such polyisocyanates may be characterized by the general formula:

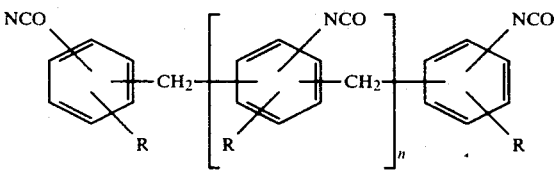

in which each R is hydrogen or lower alkyl, eg methyl ethyl or butyl and n is an integer ranging in value from 1 to 4.

The particular type of polymethylene polyphenyl polyisocyanates described in U.S. Pat. No. 4,094,869 are especially preferred. These especially preferred polymethylene polyphenyl polyisocyanates are characterized by the general formula:

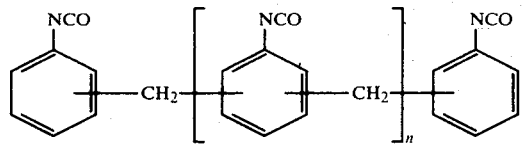

wherein n is predominantly an integer of 1 or 0 or a mixture wherein n is primarily 1 in a preferred embodiment and to a lesser extent 0, and thus the trimer, dimer or mixtures thereof, and where as preferred, this ioscyanate is used in an undistilled state, will include residual or trace amounts of high polymers as well. The average isocyanate functionality of these polymers is consequently in the range of about 2.25 to about 3.2 or higher depending upon the specific aniline-to-formaldehyde molar ratio used in the initial condensation. While aromatic amines other than aniline may be employed for the purpose of producing the cellular polyisocyanurate trimer foams described herein, the aromatic isocyanate moiety should, most desirably, not contain substituents in the ortho position. The polyphenyl polymethylene polyisocyanates thus employed are available commercially, for example, under the trade names Mondur MR, PAPI and AFPI. They are liquids having a reduced viscosity of about 50–500 centipoises at 25° centigrade (C.).

Preferred polyisocyanates as described herein may be obtained by phosgenation of mixtures of the corresponding methylene-bridged polyphenyl polyamines. The latter are secured by the hydrochloric-acid catalyzed condensation of primary aromatic amines such, illustratively, as aniline, using procedures wellknown in the art.

The polyol used in the product and process of the invention must comprise at least about 14 wt% 2-butene, -1,4-diol. This material is an established product available for instance from GAF Corp. under the name Butenediol. It is generally made by hydrogenation of butynediol which in turn is made from the reaction of acetylene and formaldehyde. Where the entire polyol component does not comprise butenediol, the remainder of the polyol may be any conventional polyol generally known for incorporation into polyisocyanurate foams including for instance the various polyols described in the above mentioned U.S. patents.

The proportion of isocyanate groups to hydroxyl groups (in the reactant polyols described above and thus including the unhalogenated, halogenated and where present, nitrogen-containing, polyols) is desirably from 2 to 8, and preferably 4 to 7, to 1, respectively. Thus the polyisocyanates are employed in amounts that provide from 200 to 800, and preferably 400 to 700, percent of the stoichiometric amount of the isocyanato groups required to react with all of the hydroxyl groups present in all of the reactant polyols. Expressed in an alternative manner, the polyol content of the reaction mixture represents about 10 percent to about 50 percent, and preferably about 15 percent to about 25 percent, by weight of the polyisocyanate incorporated in the reaction mixture. However expressed, it is critical to the invention that more than fifty percent of the isocyanato groups of the polyisocanate reactant be free to react and form isocyanurate moieties within the foam structure.

A trimerization catalyst is necessary to assure the formation of the rigid isocyanurate-urethane cellular foams of the invention. These catalysts are most desirably tertiary amines employed in small amounts. Preferred among these is 2,4,6-tris)dimethylaminomethyl)-phenol.

Other tertiary amine catalysts which can be employed are triethylamine, N-ethylmorpholine, N-methylmorpholine, N-octadecylmorpholine, tributylamine; trioctylamine; N,N,N',N'-tetramethylethylenediamine, N,N,N',N'-tetramethyl-1,3-butanediamine; triethanolamine; N,N-dimethylethanolamine; triisopropanolamine; N-methyldiethanolamine; bis(2-dimethylaminoethyl)ether; hexadecyldimethylamine; N,N-dimethylbenzyl amine; trimethylamine; triethylenediamine (i.e., 1,4-diazabicyclo-2.2.2-octane); the formate and other salts of triethylenediamine, oxyalkylene adducts of the amino groups of primary and secondary amines and other such amine catalysts which are well known in the art of polyurethane manufacture. The amine catalyst may be introduced to the polyurethane-producing reaction mixture as such or as a solution in suitable carrier solvents such as diethylene glycol; dipropylene glycol; and 2-methyl-2,4-pentanediol ("Hexylene glycol"). The amine catalyst where employed is normally present in an amount on a weight percent basis based on the weight of the polyisocyanate present of two percent to ten percent. Other standard trimerization catalysts which may also be employed, although significantly less preferred, are triethyl phosphine, which is useful selectively where trimerization of aliphatic compounds is undertaken; calcium acetate; potassium acetate; sodium formate; sodium carbonate; sodium methoxide; oxalic acid; sodium benzoate in dimethyl formamide; and a large number of soluble compounds of iron, sodium, potassium, magnesium, mercury, nickel copper, zinc, aluminum, tin, vanadium, titanium and chromium, titanium tetrabutyrate, and oxygen. The utilization of these trimerization catalysts in producing rigid polyurethane forms is well known to those skilled in the art to which this invention pertains.

In forming these rigid cellular polyurethanes the reaction mixture includes as a cell-forming component blowing agent which are vaporized by the exothermic reaction of the isocyanate and moieties present in the reactant mixture. These blowing agents are conventionally halogenated hydrocarbons, notably trichlorofluoromethane, as well as, by way of illustration, dichlorodifluoromethane, 1,1-dichloro-1-fluoroethane, hexafluorocyclobutene and octafluorocyclobutane. The principal advantage of these blowing agents is increased insulation in the foamed product. There are often economic advantages as well. It is noted additionally that the cellular foams of the invention possess a concentration of closed cells at least equivalent to that secured by the techniques known theretofore. Thus, the thermal insulation properties of the foam are not adversely affected by the incorporation of the enhanced fire retardancy described herein.

The amount of blowing agent employed in the foaming reaction will vary with the desired density of the cellular product and will also affect the closed cell content of the foam. This is of particular concern in the formation of the insulating materials described herein.

A rigid foam having a high closed cell content, that is a content of at least 85 percent closed cells as determined by ASTM D-1940, is most desirable having a density of from about 1.0 to 10 pounds per cubic foot as measured by ASTM D-1622. Accordingly, the concentration of blowing agent will usually be from about 5 percent to 50 percent and most desirably 10 percent to 35 percent by weight of the polyisocyanate incorporated in the reaction mixture.

A conventional silicone surfactant is preferably incorporated as well in the reaction system of the invention in amounts between about 1 and about 2 wt% based on isocyanate in order to stabilize, in conjection with the catalyst present, the cellular foam product. Illustrative of these are the polyoxyalkylenepolydimethyl-siloxane block copolymers. These block copolymers enhance the concentration of closed cell content and hence lower moisture permeability in addition to improving the strength properties of the foam product. Illustrative copolymers accomplishing these purposes are described in U.S. Pat. No. 3,507,815 and U.S. Pat. No. 3,563,924.

Other nonionic, cationic, and anionic surface active agents may also be used but are generally less desirably employed. Illustrative of these are the nonionic surface active agents such as polyoxypropylene-polyoxyethylene copolymers (PLURONIC polyols) which do not influence materially either closed cell content or rigidity but do facilitate dispersion of the reactants and additives included in the reaction mixture.

The polydimethylsiloxanes, while usable, are even less preferred because of their tendency to yield foams having a coarse cell structure and lower concentration of closed cells.

Additional surfactants include the long-chain fatty acid partial esters of hexitol anhydrides, polyoxyalkylene derivatives of hexitol anhydride partial long-chain fatty acid esters and the like.

The surfactant may be added with any of the two to six streams usually fed to the mixing head in the one-shot process. The amount of surfactant utilized on a weight basis is normally from about 1 percent to about 2 percent of the polyisocyanate present in the reaction mixture.

Methods of producing one-shot polyether and polyester urethane foams commercially are well known and include numerous processing variables such as the apparatus employed, mixer speeds, conveyor speeds and angles, and the like, well known to those skilled in the art to which the present invention pertains. The reaction is exothermic, as noted elsewhere herein, and as is any standard one-shot operation, each component of the formulation is admitted to the mixing head through individual lines at a predetermined speed and at ambient temperature. The surfactant is added to any of the reaction components passing as streams to the mixing head through any of several feed lines, usually 2 to 6 in number. Often the number of feed lines entering the head is reduced by introduction of the catalyst, or other components used only in small amounts, into the polyol line upstream from the mixing head. An in-line blender can be used to premix the components of the reaction system before they reach the mixing head. The orifice opening control, back pressure in the mixing head, pouring procedures are related steps are also adjusted within well-known, flexible and discretionary parameters.

The rigid foams prepared in accordance with the invention are, in any event, subject to post-curing in the absence of moisture at ambient or, if desired to accelerate the cure, at elevated temperatures, the permissible range being desirably about 20° C. to 90° C. for periods of time which will vary inversely with the curing temperature employed and varying from 1 to 24 hours. This postcure serves to complete the formation substantially of trimer within the foam structure.

EXAMPLE I

This Example illustrates the preparation of rigid cellular isocyanurate polyurethane foams in accordance with the invention. The runs reported in this Example were carried out by pouring mixed ingredients for each run, including reaction components, catalysts and additives, into a cardboard box eight inches wide by eight inches long in a free rise pour except for one run in which the mixed ingredients were poured between two asphalt saturated felts in a conventional continuous foam lamination process. Curing occurred almost immediately in each case. The resulting product was in each case permitted to stand for about 2 minutes and was then post-cured for about one hour at 90° C. in a post-curing oven. The excess of unreacted isocyanate moieties of the reactant polyisocyanate remaining upon initiation of the post-curing step formed predominantly additional triazine rings within the foam structure. Ingredients and proportions of the various reaction components, catalysts and additives used and physical characteristics of the resulting rigid foam products were as shown in Table I.

TABLE 1

| COMPOSITION OF REACTION MIXTURES | | | | |
|---|---|---|---|---|
| | Parts by Weight Product Number | | | |
| | 1 | 2 | 3 | 4 |
| Ingredients | | | | |
| Polymethylene polyphenyl polyisocyanate (Mondur MR) | 100 | 100 | 100 | 100 |
| Cis Butenediol -1,4 | 4.7 | 4.7 | 4.64 | 1.5 |
| Propoxylated Sucorse Polyol (Dow Voranol 360, equivalent wt. 152) | — | — | — | 8.8 |
| Silicone Block Copolymer Surfactant (Dow Corning 193) | 1.6 | 1.5 | 1.48 | 1.5 |
| Trichlorofluoromethane (blowing agent) | 17 | 16.2 | 18 | 16.2 |
| Amine-Triazine Trimerization Catalyst (Abbott Polycat 41) | 1.3 | 1.55 | 1.64 | 1.4 |
| Potassium Octoate Solution Trimerization Catalyst (M&T T-45) | 0.4 | 0.03 | 0.06 | 0.2 |
| PHYSICAL PROPERTIES OF FOAM PRODUCTS | | | | |
| Properties | | | | |
| Density (lbs. per cubic ft.) | 1.63 | 1.86 | 1.69 | 2.09 |
| Compressive Strength (lbs. per sq. in.) | | | | |
| Parallel to Foam | 16.9 | 23.3 | — | 28.0 |
| Perpendicular to Foam | 11.6 | 16.2 | — | 15.9 |
| Laminate | — | — | 11.6 | — |
| Oxygen Index (ASTM D-2863) | — | 31.4 | 35.4 | — |
| Percent Weight Retained After 1 hr. at 300° C. in Air | 85 | 82 | 89 | 81 |

EXAMPLE 2

For this example, two rigid foam products were made as described in Example 1 using ingredients shown in Table 2. Density and percent weight retained after 1 hour are also shown in Table 2 for these products. From Table 2 it can be seen that the use of cis butenediol-1,4 instead of the conventional butanediol-1,4 in products of essentially the same density resulted in significant improvement in thermal stability in terms percent weight retained after 1 hour at 300° C. in air.

TABLE 2

| COMPOSITION OF REACTION MIXTURES | | |
|---|---|---|
| | Parts by Weight Product Number | |
| | 5 | 6 |
| Ingredients | | |
| Polymethylene polyphenyl polyisocyanate (Mondur (MR) | 100 | 100 |
| Cis Butenediol -1,4 | 4.8 | — |
| Butanediol, -1,4 | — | 4.7 |
| Silicone Block Copolymer Surfactant (Dow Corning 193) | 1.5 | 1.5 |
| Trichlorofluoromethane (Blowing agent) | 16.2 | 16.2 |
| Amine-Triazene Trimerization Catalyst (Abbott Polycate 41) | 1.7 | 1.6 |
| Potassium Octoate Solution Trimerization Catalyst (M&T T-45) | 0.1 | 0.05 |
| PROPERTIES OF FOAM PRODUCTS | | |
| Properties | | |
| Density (lbs. per cubic ft. | 2.07 | 2.06 |
| Compressive Strength (lbs. per sq. in.) | | |
| Parallel to Foam | — | — |
| Perpendicular to Foam | — | — |
| Laminate | — | — |
| Oxygen Index (ASTM D-2863) | — | — |
| Percent Weight Retained After 1 hr. at 300° C. in Air | 80.4 | 75 |

The cellular polyester and polyether isocyanurate urethane rigid foams of the invention have particular application, as indicated hereinabove, as thermal insulating materials, particularly for utilization in roofing applications and other construction materials. These foam products have been found to have significant value when employed between facings of roofing felt, such as asphalt-impregnated roofing felt, for use above steel decks and platforms where rigid government and industry standards usually obtain.

While the invention has been described with respect to preferred embodiments thereof, it will be understood by those skilled in the art that various changes and modifications may be made without departing from the spirit or scope of the invention.

What is claimed is:

1. Thermally stable, rigid cellular isocyanurate polyurethane foam comprising the post cured reaction product of reacting in the presence of a blowing agent and trimerization catalyst:
    (a) polyol comprising at least about 14 wt% 2-butene,-1,4-diol; and
    (b) aromatic polyisocyanate in an amount such that the active hydrogen groups present in the polyol are less than 50% of the number of isocyanate groups present in the polyisocyanate of the reaction mixture.

2. Rigid foam according to claim 1 wherein the polyisocyanate comprises at least about 50% polymethylene polyphenyl polyisocyanate.

3. Rigid foam according to claim 2 wherein the average isocyanate functionality of the polyisocyanate is in the range between about 2.25 and about 3.2.

4. Rigid foam according to claim 1 which also includes silicone surfactant in an amount between about 1 and about 2 wt% based on isocyanate.

5. Rigid foam according to claim 1 wherein the blowing agent is trichlorofluoromethane.

6. Rigid foam according to claim 1 wherein the proportion of isocyanate groups to hydroxyl groups is between about 2 to 1 and about 8 to 1.

7. Process for preparing a thermally stable, rigid cellular isocyanurate polyurethane foam which comprises reacting in the presence of a blowing agent and trimerization catalyst:
    (a) polyol comprising at least about 14 wt% 2-butene,-1,4-diol; and
    (b) aromatic polyisocyanate in an amount such that the active hydrogen groups present in the polyol are less than 50% of the number of isocyanate groups present in the polyisocyanate of the reaction mixture, and subjecting the resulting reaction mixture to post curing.

8. Process according to claim 7 wherein the polyisocyanate comprises at least 50% polymethylene polyphenyl polyisocyanate.

9. Process according to claim 8 wherein the average isocyanate functionality of the polyisocyanate is in the range of between about 2.25 and about 2.2.

10. Process according to claim 7 wherein the blowing agent comprises trichlorofluoromethane and the trimerization catalyst comprises tertiary amine catalyst.

11. Process according to claim 7 wherein silicone surfactant is present in an amount between about 1 and about 2 wt% based on isocyanate.

* * * * *